United States Patent
Harper et al.

(10) Patent No.: US 8,743,223 B2
(45) Date of Patent: Jun. 3, 2014

(54) LINKING CAPTURED IMAGES USING SHORT RANGE COMMUNICATIONS

(75) Inventors: Richard Harper, Cambridge (GB); Philip Gosset, Stroud (GB); Richard M. Banks, Cambridge (GB)

(73) Assignee: Microsoft Corporation, Redmond, WA (US)

(*) Notice: Subject to any disclaimer, the term of this patent is extended or adjusted under 35 U.S.C. 154(b) by 378 days.

(21) Appl. No.: 12/035,004

(22) Filed: Feb. 21, 2008

(65) Prior Publication Data
US 2009/0213245 A1 Aug. 27, 2009

(51) Int. Cl.
*H04N 5/232* (2006.01)

(52) U.S. Cl.
USPC ............ 348/211.2; 348/211.3; 348/211.1

(58) Field of Classification Search
USPC ............ 348/211.2, 211.3; 455/456.1–456.3, 455/41.1–41.2
See application file for complete search history.

(56) References Cited

U.S. PATENT DOCUMENTS

| | | | |
|---|---|---|---|
| 5,499,294 A * | 3/1996 | Friedman | 713/179 |
| 6,307,526 B1 | 10/2001 | Mann | |
| 2004/0005915 A1 * | 1/2004 | Hunter | 455/575.1 |
| 2004/0070563 A1 | 4/2004 | Robinson | |
| 2004/0208496 A1 | 10/2004 | Pilu | |
| 2006/0174203 A1 * | 8/2006 | Jung et al. | 715/751 |
| 2006/0187228 A1 | 8/2006 | Jung et al. | |
| 2006/0199534 A1 | 9/2006 | Smith | |
| 2006/0240774 A1 * | 10/2006 | Blom et al. | 455/41.1 |
| 2008/0032739 A1 | 2/2008 | Hoodbhoy et al. | |
| 2008/0061137 A1 * | 3/2008 | Dutta et al. | 235/380 |
| 2008/0214235 A1 * | 9/2008 | Sagou et al. | 455/556.1 |
| 2009/0132583 A1 * | 5/2009 | Carter et al. | 707/104.1 |

FOREIGN PATENT DOCUMENTS

| | | |
|---|---|---|
| EP | 1804158 | 7/2007 |
| WO | WO2007067335 | 6/2007 |
| WO | WO2007067373 | 6/2007 |

OTHER PUBLICATIONS

"Corncord Eye-Q Go Wireless Bluetooth Digital Camera", at <<http://www.living room.org.au/photolog/news/concord_eyeq_go_wireless_bluetooth_digital_camera.php<>, pp. 5.
Hodges, et al., "SenseCam: A Retrospective Memory Aid", Springer, 2006, pp. 17.
Khan, et al., "Bluetooth-Based Wireless Personal Area Network for Multimedia Communication", IEEE, 2002, pp. 5.
"Wearable Camera Could Store Your Life in Images", at <<http://news.zdnet.co.uk/hardware/0,1000000091,2135096,00.htm >>, pp. 3.
Zimmerman, "Wireless Networked Digital Devices: A New Paradigm for Computing and Communication", at <<http://www.research.ibm.com/journal/sj/384r/zimmerman.html>>, vol. 38, No. 4, 1999, pp. 8.

* cited by examiner

*Primary Examiner* — Roberto Velez
*Assistant Examiner* — Yih-Sien Kao
(74) *Attorney, Agent, or Firm* — Pablo Tapia; Jim Ross; Micky Minhas

(57) ABSTRACT

Methods and apparatus for linking captured images using short range communications or a personal area network are described. In an embodiment, an image capture device is described which detects devices in proximity to the device and stores data identifying the devices and the times when they were in proximity. In another embodiment, a computing-based device is described which uses the data stored by an image capture device to identify sequences of images which were captured by a group of devices in proximity to each other and to present these sequences to a viewer concurrently and in temporal alignment.

17 Claims, 14 Drawing Sheets t = 0 t = 10 t = 20 t = 30 t = 40

LINKING CAPTURED IMAGES USING SHORT RANGE COMMUNICATIONS

BACKGROUND

Digital cameras and digital video cameras have resulted in users generating large amounts of digital image data which records places they have been, events they have attended and people they have met. In order to share this data with friends, a user may upload their digital images to a web service which provides controlled access to the user and anyone the user authorizes to view the images, such as a gallery service or social networking website. Alternatively, a user may upload their images to a video/photograph sharing website or a mapping website, which may enable anyone to view their videos/photographs.

Automatic image capture devices have been developed which enable users wearing such a device to capture a sequence of images which record their surroundings and the objects that they can see. SenseCam® developed by Microsoft® is an example of such a device.

The embodiments described below are not limited to implementations which solve any or all of the disadvantages of known image capture devices.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods and apparatus for linking captured images using short range communications or a personal area network are described. In an embodiment, an image capture device is described which detects devices in proximity to the device and stores data identifying the devices and the times when they were in proximity. In another embodiment, a computing-based device is described which uses the data stored by an image capture device to identify sequences of images which were captured by a group of devices in proximity to each other and to present these sequences to a viewer concurrently and in temporal alignment.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Digital image capture devices, such as digital cameras or digital video cameras enable users to collect image data which they can share with friends or with anyone (as described above). However, this data is viewed in isolation of image data which may have been captured by another user at approximately the same time and at approximately the same place (e.g. at the same event). The term 'image data' is used herein to refer to any form of image, including still images or video clips.

An image capture device is described which stores data at, and/or around, the time of image capture which enables images captured by different devices which are in geographical proximity to be subsequently linked. This data may include one or more of the time the image was captured, the location at which the image was captured, the devices in proximity at (or around) the time the image was captured etc. When the stored data (and in some examples the images) from more than one image capture device are subsequently uploaded to a computing device, the computing device can use the stored data to identify sequences of images were captured by groups of devices whilst in proximity to each other and which can then be displayed to a viewer concurrently (e.g. within the same window) and in temporal alignment. The sequences of images may be displayed in the same window but they are displayed in different regions of that window such that they can each be viewed without being significantly obscured by other sequences.

The linking of images captured in geographical proximity enables a viewer to see more than one set of images captured at a particular event, e.g. a sporting event, music concert, holiday destination (e.g. a ski resort) and gain a better (e.g. more detailed) impression of such an event. The images are not stitched together to form a single sequence of images but retain their individual identity. The viewer may be the user of one of the image capture devices or may be a third party.

Figure 1:
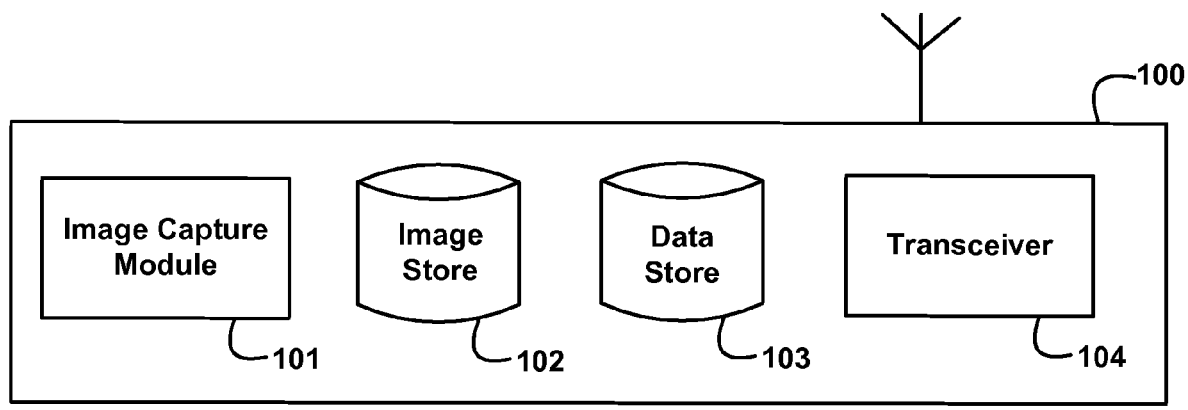
FIG. 1 is a schematic diagram of an image capture device.
Figure 2:
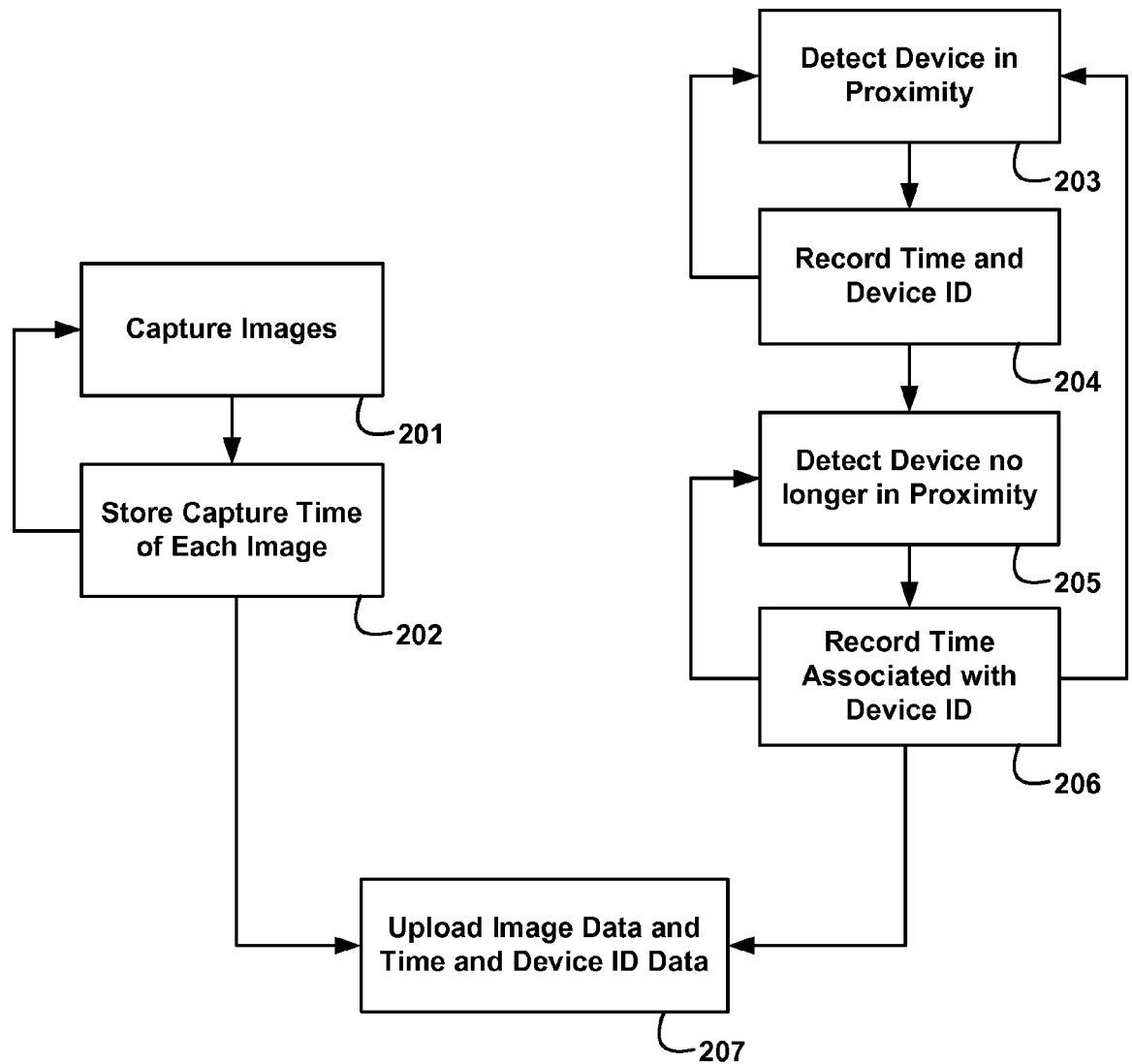
FIG. 2 is a flow diagram of an example method of operation of an image capture device.
Figure 3:
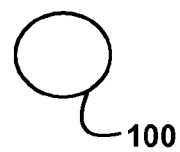
FIG. 3 is a schematic diagram showing a sequence of events relating to image capture device.
Figure 3:
Figure 3:
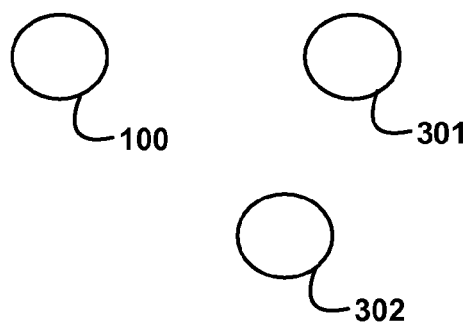
Figure 3:
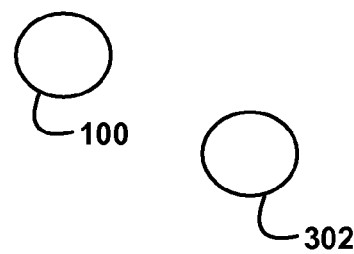
Figure 3:
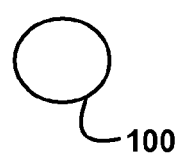

FIG. 1 is a schematic diagram of an image capture device 100 which comprises an image capture module 101, an image store 102, a data store 103 and a transceiver 104. The operation of the image capture device 100 can be described with reference to FIGS. 2 and 3. FIG. 2 is a flow diagram of an example method of operation of an image capture device, such as that shown in FIG. 1 and FIG. 3 is a schematic diagram showing a sequence of events relating to image capture device 100.

The image capture device may be a digital camera, a wearable camera (e.g. SenseCam®), a mobile telephone, a personal digital assistant (PDA) or any other device which is capable of capturing images, the time of capture and data to enable determination of devices which are in proximity. The image capture device may be a dedicated device or may be a device running an application in order to operate as described herein.

The image capture device 100 captures images (block 201) using the image capture module 101. These images may be still images or video clips and may be captured automatically or may be captured as a result of user input. Where the images are captured automatically, image capture may be triggered based on elapsed time, sensor data or any other trigger parameter. An example of a device triggered using sensor data is described below and shown in FIG. 6. The capture time for each captured image is stored (block 202) and this may, for example, be stored in metadata associated with the image. The captured images and any associated metadata may be stored in the image store 102. Alternatively, the capture time data may be stored separately in the data store 103. One or more images may be captured and stored.

The image capture device also detects other devices in proximity to the image capture device (block 203). This may be performed in parallel to image capture (in block 201) or may be performed each time an image is captured (e.g. following block 201 or block 202). The proximity detection may be performed automatically or upon receipt of a user input. The proximity detection may use any personal area network (PAN) or short range communication technology and may use transceiver 104. When a device is detected, the time of detection and an identifier (ID) for the detected device are stored (block 204) and this data may be stored in the data store 103 or in metadata associated with captured images (as described below). The device identifier may have any form, such as a device name, an address (e.g. for the device or an interface device within the address), etc. Alternatively, or in addition, the device identifier may identify the user of the device. When it is subsequently determined that the detected device is no longer in proximity (in block 205), the time at which this occurred is also stored associated with the identifier for the particular device (block 206).

FIG. 3 shows a simple sequence of events relating to a first image capture device 100. Initially there are no other devices in proximity to the first image capture device 100 (at t=0). Subsequently, the first device detects the presence of a second device 301 (as in block 203) and the time of detection and device ID for this second device are recorded (as in block 204), e.g. t=10, device=301. Some time later, a third device 302 is detected by the first device (as in block 203) and the time and ID are stored (as in block 204), e.g. t=20, device=302. When the second device 301 moves away, this is detected by the first device 100 (as in block 205) and the time is stored associated with the identifier for the second device (as in block 206), e.g. device=301, proximate from t=10 to t=30. When the first device detects that the third device 302 has moved away (as in block 205), the time of this event will also be stored (as in block 206), e.g. device=302, proximate from t=20 to t=40.

Subsequently, the captured image data and the time and device ID data may be uploaded to another device, such as a web server (block 207). The captured image data which is uploaded may comprise the images themselves or links to where the images are stored. The data (e.g. captured image, device ID and time data) may be uploaded directly from the image capture device 100 to a web server (or other entity), which may be remote, or may be uploaded via another entity, such as a local PC. The operation of the web server or other entity to which the image data and associated data are uploaded is described in more detail below.

The detection of devices in proximity (in block 205) and the detection that devices are no longer proximate (in block 206) may be performed using any PAN or short range communication technology. For example, a Bluetooth® discovery mechanism may be used and the transceiver 104 may comprise a Bluetooth® transceiver. Using this mechanism, Bluetooth enabled devices, when in a discoverable mode, periodically broadcast their Bluetooth ID (and/or Bluetooth name) and this can be detected by other Bluetooth enabled devices within a short distance (e.g. of the order of a few meters, up to tens of meters, although this is technology dependent). By monitoring the broadcast IDs, an image capture device 100 can detect when a new device comes into proximity and when it moves out of range (i.e. when the broadcast of its Bluetooth ID/name can no longer be received). In another example, IrDA or WiFi may be used and therefore the transceiver 104 may comprise an IrDA or WiFi transceiver respectively. In the WiFi example, the identifier may be the MAC address of the WiFi device or a device name. Other technologies may be used such as Radio Frequency Identification (RFID) technology. Alternatively, longer range wireless technologies may be used (such as cellular technology) and the set of detected devices may be filtered based on defined criteria, such as signal strength, to identify those devices which are in proximity. In further examples, more than one technology may be used.

In the above example, using PAN or short range communications technology, a device identifier is broadcast by devices and detected by other devices which are within range. In addition to communicating device identifiers, other information may be broadcast or subsequently shared between proximate devices. This other information may comprise additional identifiers, device class information, keys for use in authentication, time stamps etc. Where keys are shared between devices, the key may be used to control access to sequences of images (e.g. when the sequences of images are subsequently displayed). Where time stamps are shared, these may be used to record local timings according to different devices.

When performing proximity detection, the image capture device may detect devices which are not image capture devices but which are in geographical proximity. The image capture device may store data on all proximate devices or alternatively, the proximity data may be filtered (e.g. by device class) and only those identifiers for a subset of the proximity devices may be stored. In an example, devices may share a flag or token that indicates that they are enabled for image linking as described herein. In this example, only those identifiers with a corresponding flag or token may be stored.

There are many different ways in which the proximity data can be recorded (in blocks 204 and 206) and one example is given above. In another example, the data may be stored as a register of proximate devices as shown below for the example of FIG. 3:

| Time | Proximate device IDs |
|---|---|
| t = 0 | |
| t = 10 | 301 |

-continued

| Time | Proximate device IDs |
|---|---|
| t = 20 | 301, 302 |
| t = 30 | 302 |
| t = 40 | |

In another example, the data may be indexed by device identifier:

| Proximate device ID | Proximity times |
|---|---|
| 301 | 10-30 |
| 302 | 20-40 |

It will be appreciated these are described by way of example only and that the data may be stored in many different ways, e.g. referenced by image number, with times defined in terms of duration of proximity etc. This stored data may be referred to as a register.

In another example, the data identifying proximate devices may be stored as metadata associated with captured images. For example, if image capture device 100 captures nine images at five second intervals in the example scenario shown in FIG. 3, the metadata may comprise:

| Image no. | Capture time | Proximate devices |
|---|---|---|
| 1 | 0 | |
| 2 | 5 | |
| 3 | 10 | 301 |
| 4 | 15 | 301 |
| 5 | 20 | 301, 302 |
| 6 | 25 | 301, 302 |
| 7 | 30 | 302 |
| 8 | 35 | 302 |
| 9 | 40 | |

As shown in this example, the proximity detection does not need to be synchronized with image capture, although in some examples, the two operations may be synchronized or image capture may trigger proximity detection.

Each of the devices may perform proximity detection and store the related data (as in blocks 203-206) or alternatively only a subset of the devices may perform proximity detection and store the related data (as in blocks 203-206). Those devices not performing proximity detection may still capture images (blocks 201-202) and their images may, in some examples, still be linked to other sets of images based on the proximity data stored by the subset of devices. In another example, a separate device, which may not be an image capture device, may detect proximate devices and upload this proximity data to the central entity (such as computing device 700 described below) to enable it to link sequences of images captured by other devices. For example, a receiver (e.g. a WiFi access point) may be located at a particular event to record those image capture devices at the event. This data may be subsequently used to link images captured at the event.

Whilst FIG. 1 shows a transceiver 104, it will be appreciated that in some examples the image capture device 100 may comprise a transmitter and a receiver or, dependent on the technology used for proximity detection, may comprise only a receiver. In a further example, shown in FIGS. 4 and 5, the image capture device 400 may not comprise a transceiver but may instead comprise a location sensor 401, such as a GPS receiver. The operation of the image capture device is similar to that described above with reference to FIG. 2, however instead of performing proximity detection (in block 203), the image capture device may store the location where each image is captured (block 501). In another example, the location information may be transmitted to the device from another device (e.g. a cellular base station, wireless access point or local beacon). The location information is stored and subsequently uploaded along with the captured image and the capture time (block 502). In further examples, a device may perform both proximity detection (as in block 203) and location sensing (as in block 501), may store both data types (as in blocks 204 and 502) and subsequently upload some or all of the stored data (as in block 207 and/or 502). The data uploaded which comprises time data and proximity and/or location data may be referred to herein as 'associated data'.

Figure 4:
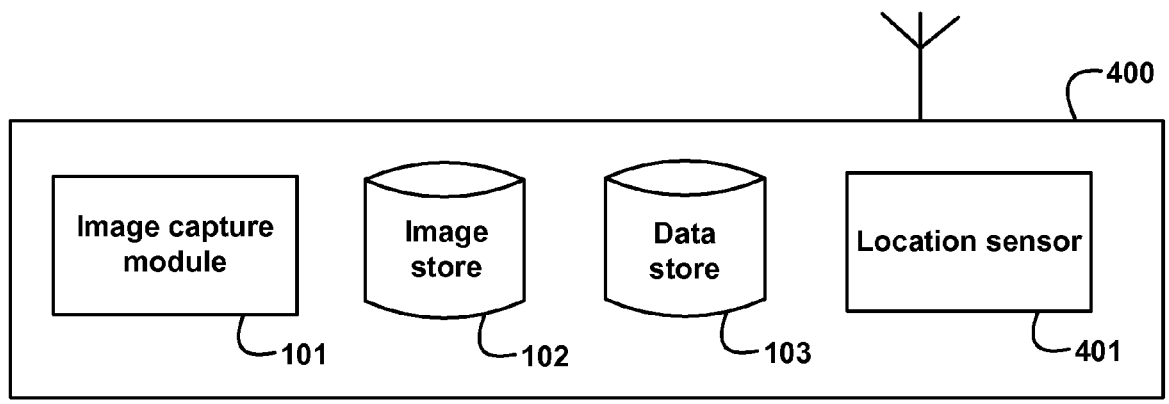
FIG. 4 is a schematic diagram of another image capture device.
Figure 5:
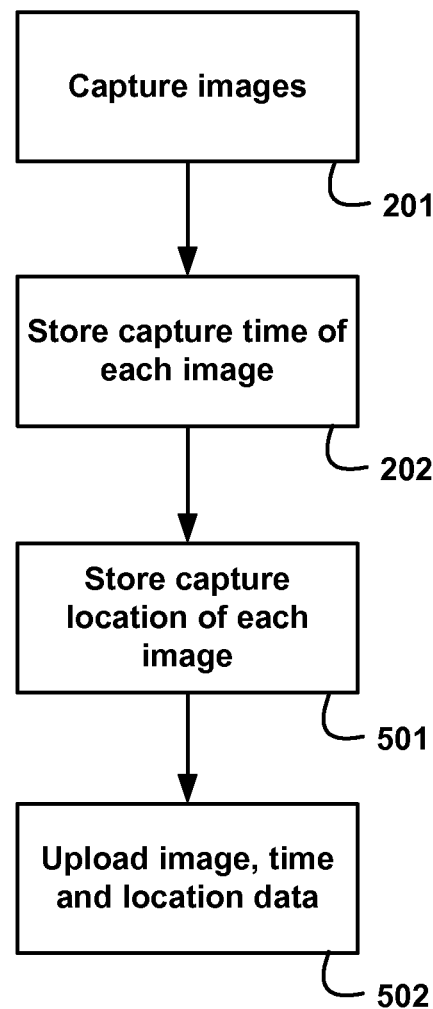
FIG. 5 is a flow diagram of another example method of operation of an image capture device.
Figure 6:
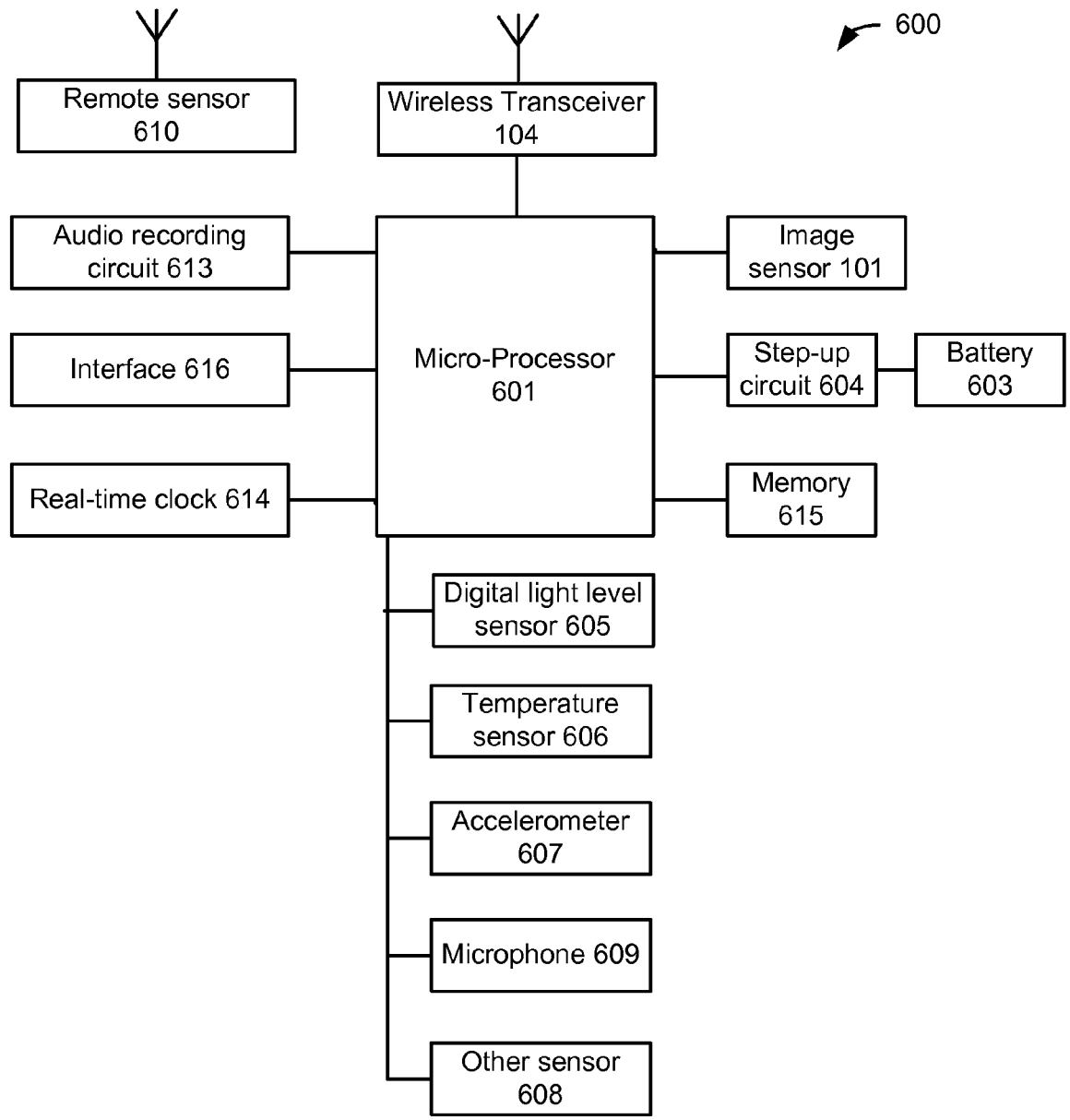
FIG. 6 is a schematic diagram of a further image capture device.

FIG. 6 is a schematic diagram of another example image capture device 600. This device is an automatic image capture device and comprises a microprocessor 601 connected to an image sensor 101 having a wide angle or fish-eye lens (not shown). The device is powered by a battery 603 and the voltage may need to be stepped up via a step-up circuit 604 to power the microprocessor 601. The microprocessor triggers the capturing of an image when data from one or more sensors 605-610 indicates that a specified capture condition (also referred to as a capture trigger) has been met. The sensors may be integrated into the device, such as a digital light level sensor 605, a temperature sensor 606, accelerometer 607, microphone 609 or other sensor 608 or alternatively the sensors may be external to the device (e.g. remote sensor 610) with the sensor data being received by the wireless transceiver 104. This transceiver 104 may also be used to detect devices in proximity (as described above) or alternatively the device may comprise a location sensor (as shown in FIG. 4). The data from the accelerometer 607 may be used to mitigate against, and/or correct for, blurring of the images due to motion of the wearer (e.g. by detecting a stable condition prior to initiating image capture). The device also comprises memory 315 which may comprise the image store 102 and data store 103 described above. The device may further comprise audio recording circuitry 613, a real time clock 614 and an interface 616 (e.g. a serial interface such as a USB or RS-232 interface) for uploading and downloading data (such as the image and associated data) to/from the device. Alternatively, such uploading and downloading may be done over a wireless link via the wireless transceiver 104 or via a removable memory element.

Figure 7:
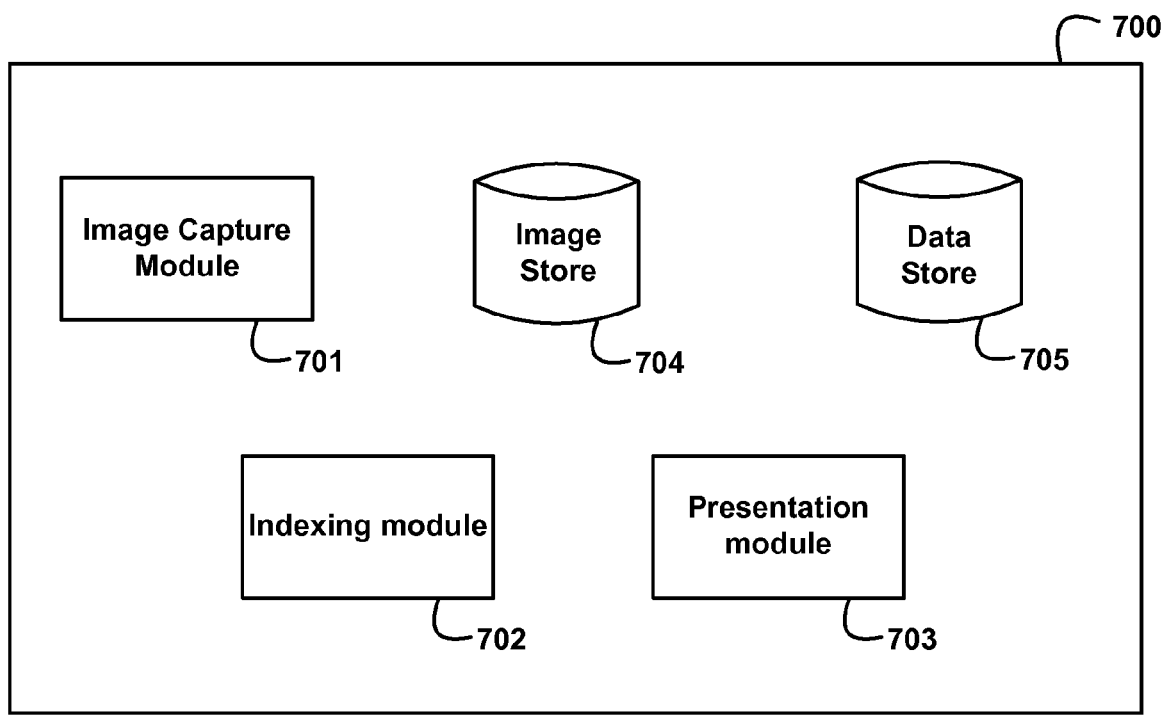
FIG. 7 shows a schematic diagram of an example of a computing device.

As described above, the images captured and data stored by an image capture device 100, 400, 600 may be uploaded to computing device (in blocks 207 and 502), such as a web server. FIG. 7 shows a schematic diagram of an example of such a computing device 700 and an example of its method of operation can be described with reference to the flow diagram shown in FIG. 8. The computing device 700 comprises a communication interface 701, an indexing module 702, a presentation module 703, an image store 704 and a data store 705.

Figure 12:
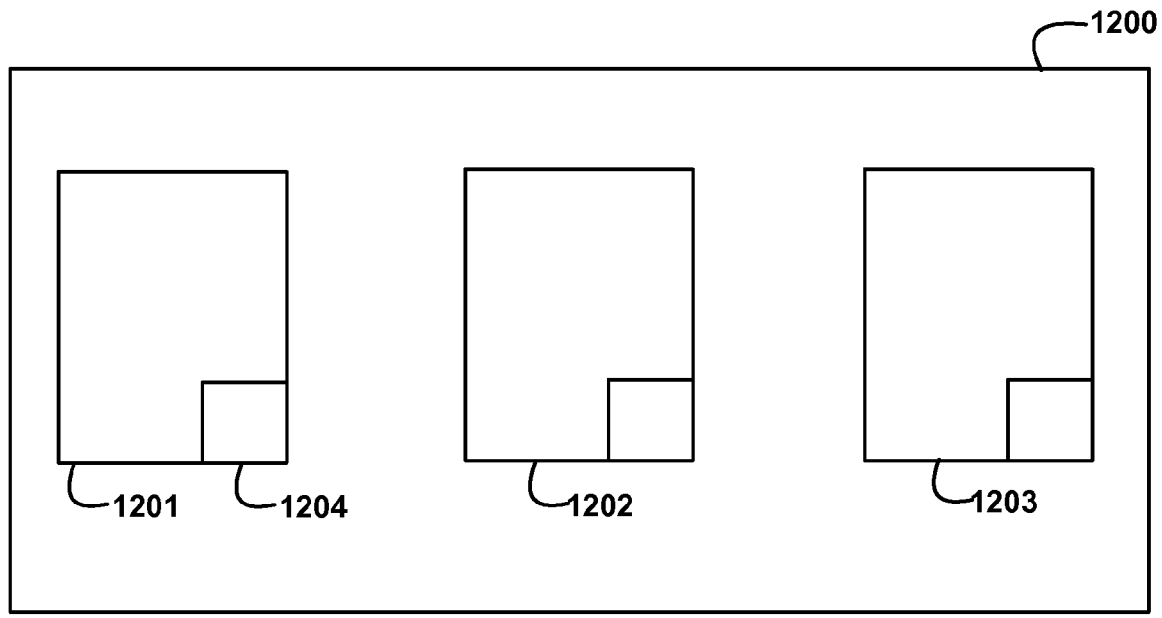
FIG. 12 shows an example of a user interface which may be used to present linked sequences of images.

The computing device 700 receives image data and associated data, such as time and device ID data, from a plurality of devices (block 801). Alternatively, the associated data may comprise time and location data (as described above with reference to FIGS. 4 and 5). As described above, the image data may comprise the images themselves (e.g. the image files) or may comprise information identifying where the images are stored (e.g. a url, IP address, file path, link etc) and the images may comprise still images or video clips. The data is received (in block 801) via the communications interface 701 and then stored (block 802) in the image store 704 and the data store 705 (which may in some embodiments be a combined store). The stored data is then used to link sequences of images received from different users which were captured whilst in proximity to each other (block 803) and this process, which is performed by the linking module 702, is described in more detail below. The identified sequences (from block 803) can then be subsequently presented to a viewer concurrently and in temporal alignment on demand (block 804), e.g. the sequences may be shown in different areas of a graphical user interface with images being displayed at a time based on their capture time, such that images from different sequences which were captured at the same time are displayed at the same time. The images are not stitched together but instead are displayed alongside each other in separate regions of the window. The separate regions may overlap to a degree as long as the majority of each sequence of images is still visible and not obscured by another sequence. This presentation is described in more detail below and an example of a user interface is shown in FIG. 12.

Figure 8:
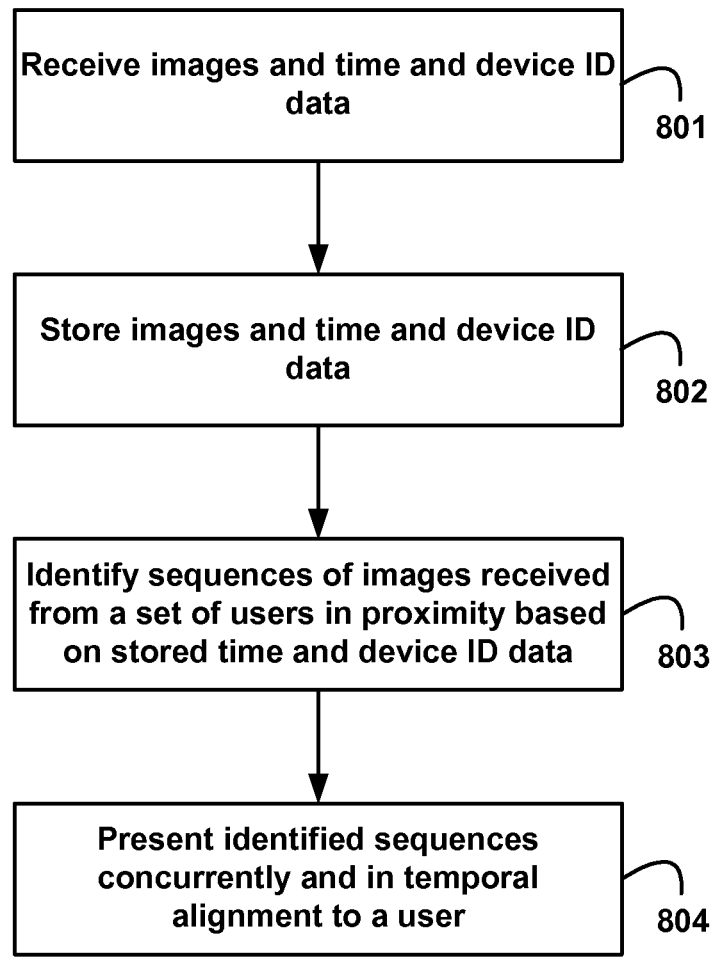
FIG. 8 is a flow diagram of an example method of operation of a computing device such as shown in FIG. 7.

As described above, the image data and associated data may be uploaded directly from the image capture device to the computing device 700 (e.g. using a wired or wireless link) or alternatively, the images and data may first be uploaded to a first computing device (such as the user's PC) and then uploaded from that first computing device to a computing device 700 which performs a method such as that shown in FIG. 8. The uploading may involve transferring the image data and associated data across a network, such as the internet.

Figure 9:
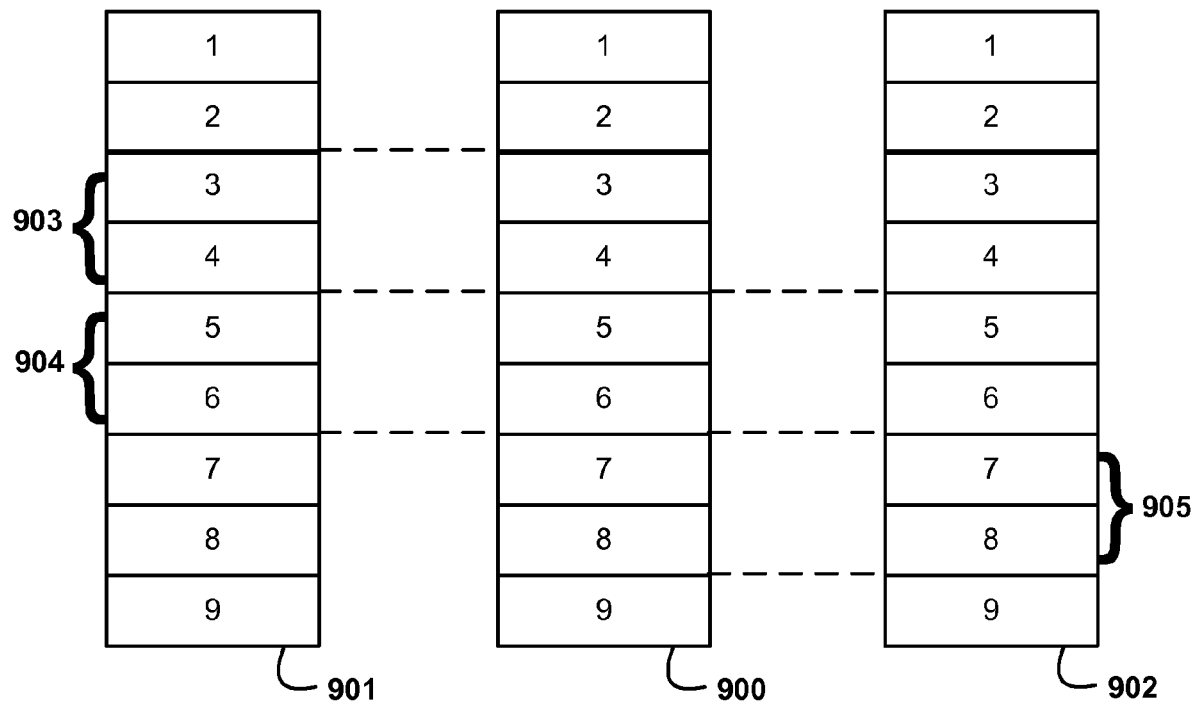
FIG. 9 shows a graphical representation of the method block of linking sequences of images.

The identification of sequences of images (in block 803) finds sequences of images which were captured by devices at a time when they were in geographical proximity. These sequences which have been identified may be referred to as 'linked images' or 'linked sequences'. This can be described using the example shown in FIG. 3 (and described above) and the graphical representation shown in FIG. 9. If each of the three devices 100, 301, 302 captured images at five second intervals starting at t=0 and uploaded the nine captured images (and associated data) as sequences 900, 901, 902 respectively, the images would be linked as follows:

images 3 and 4 from the first and second devices 100, 301 (indicated 903);
  images 5 and 6 from each of the devices 100, 301, 302 (indicated 904); and
  images 7 and 8 from the first and third devices 100, 302 (indicated 905).

Whilst this shows that all three image capture devices capture images at the same time, this is by way of example only and in most examples image capture is not synchronized between devices.

Figure 10:
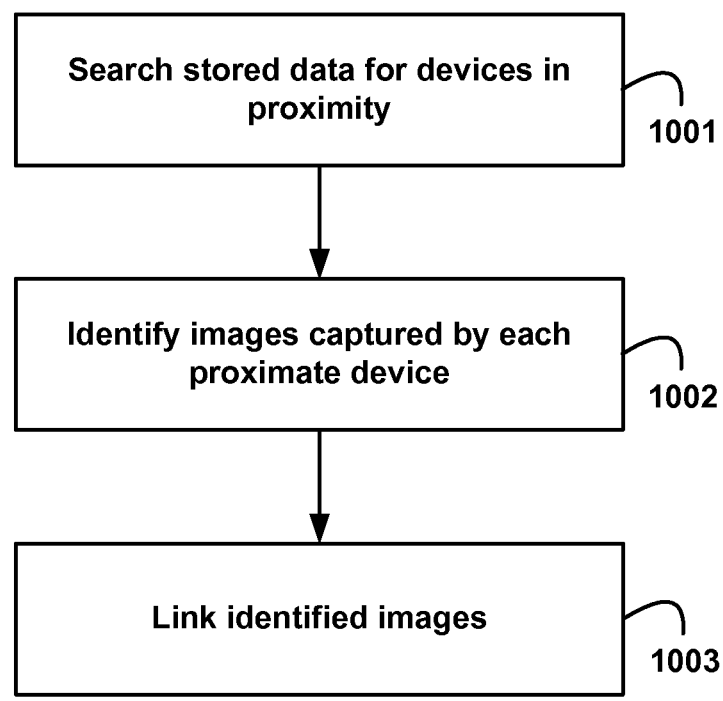
FIGS. 10 and 11 show method blocks of FIG. 8 in more detail.

The linking process may be performed as shown in FIG. 10, by searching the stored data (in data store 705) for a set of devices in proximity to each other for a period of time (block 1001). Images captured by each of the proximate devices during the period of proximity are identified (block 1002) and the identified images are linked (block 1003). The images may be linked (in block 1003) by storing data identifying those images which are linked, by grouping linked images within the image store or by any other suitable technique. Alternatively, the results of the search for proximate devices (in block 1001) may be stored (e.g. as data identifying the sets of proximate devices along with data detailing the times that each set existed) and the relevant images identified and linked (in blocks 1002 and 1003) just before they are presented (in block 804), i.e. following a demand for the presentation of linked sequences. The search for proximate devices (in block 1001) may be based on device identifiers within the data and/or location information relating to captured images (as described above). Where location data is used, criteria may be defined to enable proximate devices to be identified and this criteria may, for example, comprise a threshold of device separation (with devices separated by a distance less than the threshold being considered proximate) or may comprise an area of interest (such as an area a sporting, music or other event) and all devices within the area of interest may be considered proximate.

The linking process (block 803 and FIG. 10) may link images uploaded by any image capture device to the computing device 700 or alternatively the image capture devices may be arranged in groups and only those images uploaded by an image capture device within a particular group may be linked. For example, family groups or groups of friends may be defined such that images captured by any member of the family group or the friends group may be linked but these images cannot be linked with images captured by third parties. An image capture device may belong to more than one group.

Where the image data uploaded (in blocks 207 and 502) comprises video clips, rather than still images, the video clips may be segmented according to the devices in proximity and linked in a corresponding manner to sequences of images. Image data of different types may be linked, e.g. video clips may be linked to sequences of still images. If in the example described above with reference to FIGS. 3 and 9, the image capture device devices 100, 301, 302 captured a video clip during time period t=0 to t=40, rather than a sequence of nine still images, the clips may be divided into segments such that the following segments are linked:

segments captured from t=10 to t=20 by the first and second devices 100, 301;
  segments captured from t=20 to t=30 by each of the three devices 100, 301, 302; and
  segments captured from t=30 to t=40 by the first and third devices 100, 302.

Figure 11:
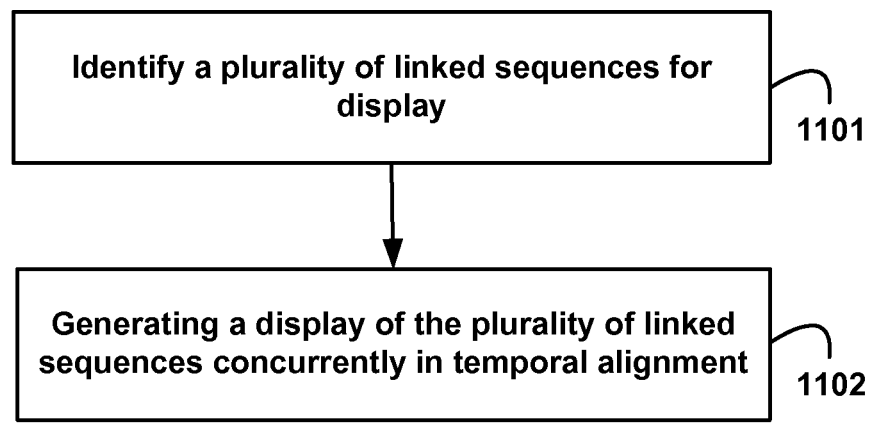

The presentation of the linked sequences on demand (in block 804) may comprise identifying a plurality of linked sequences for display (block 1101) and then generating a display comprising the plurality of linked sequences displayed concurrently and in temporal alignment (block 1102), as shown in the flow diagram in FIG. 11. The identification of the plurality of linked sequences for display (in block 1101) may be based on user input, user identity (e.g. whether they are a member of a particular group) or any other factor. The generation of the display of the plurality of linked sequences concurrently and in temporal alignment (in block 1102) may comprise generation of a web page or other form of graphical user interface which displays the plurality of linked sequences or may comprise sending each of the plurality of linked sequences to an address which corresponds to an area on a display, such as a situated display and this is described in more detail below.

FIG. 12 shows an example of a user interface which may be used to present the linked sequences of images (which may be linked video clips and/or linked sequences of still images). The user interface 1200 comprises one or more regions 1201-1203 which are used to display linked sequences of images from different sources. The regions are substantially non-overlapping. The sequences of images are displayed concurrently and in temporal alignment (i.e. in synchronicity) such that images are displayed in the order that they were captured and where images from different sources were captured at the same time, they are displayed together. Text, an image, an icon or other identifier may be displayed (e.g. in region 1204 to indicate the source of the image sequences. In an example, the different sources may comprise image capture devices used by different members of a family and images of each family member may be displayed alongside the sequence of images to indicate the user that captured the particular sequence of images. The location of the regions may, in some examples, be indicative of the relative locations of the image capture devices when the sequences of images were captured. For example, at a music event there may be two stages and images captured in the vicinity of each of the two stages may be displayed in separate areas of the UI or alternatively may be displayed in two separate windows.

As described above, the display of the plurality of linked sequences concurrently and in temporal alignment may be generated (in block 1102) by sending each of the plurality of linked sequences to an address which corresponds to an area on a display. The display comprises a plurality of regions (similar to regions 1201-1203 in the user interface example) each with a unique address, such as an email address, IP address, telephone number etc. The display also comprises content receiving and rendering modules which receive sequences of images via the unique addresses and render them in the corresponding region. The display may be an automatic display permanently associated with a physical location, be that location a geographical location or a site on another object (e.g. a bus or a train), and may also be referred to as a 'situated display'. Such a display is described in more detail in European Patent Application No. 0670001.8, filed Jan. 3, 2006 which is hereby incorporated by reference. The display may, for example, be located at the event at which the sequence of images have been captured (e.g. at a sporting or music event).

The plurality of linked sequences of images which are selected for display may be filtered based on the image capture device which captured the images, in a corresponding manner to the filtering which may occur on linking (in block 803) described above. In an example, only members of a particular group may be able to view linked sequences comprising images uploaded by other members of the group and therefore the plurality of linked sequences may be filtered by group. In other examples, other filter criteria may be used.

The process performed by the computing device 700 as shown in FIG. 8 may be offered as a service, such as a web service. The service provider may charge for this service on the basis of one or more factors, such as the number of linked streams presented to a viewer or on a time basis (e.g. a daily or monthly charge). In addition, or instead, a region of the user interface or window may be used to display advertising. In another example, a service may be provided by a PAN or WiFi host (e.g. where use of a particular PAN or WiFi domain can be effectively demarcated, as maybe possible in certain contexts, for example a concert which may occur in a place where only one PAN or WiFi net is functional). In these situations the host may provide an indexing and display service to those who register and attend the event in question. A fee may be charged for this service and levied against the users and/or the event organizers. A further alternative may be that a PAN provider or WiFi host will claim rights to all such multi-view PANS and will seek to monetize viewing of the digital traces post hoc. This may, for example, be part of a contractual arrangement set up with ticketing terms and conditions for a concert. Yet another example would be the provision of cameras (e.g. wearable cameras) to all participants in an event whose data is then aggregated on return of the devices (e.g. as in a rental arrangement). Other scenarios can also be imagined.

Figure 13:
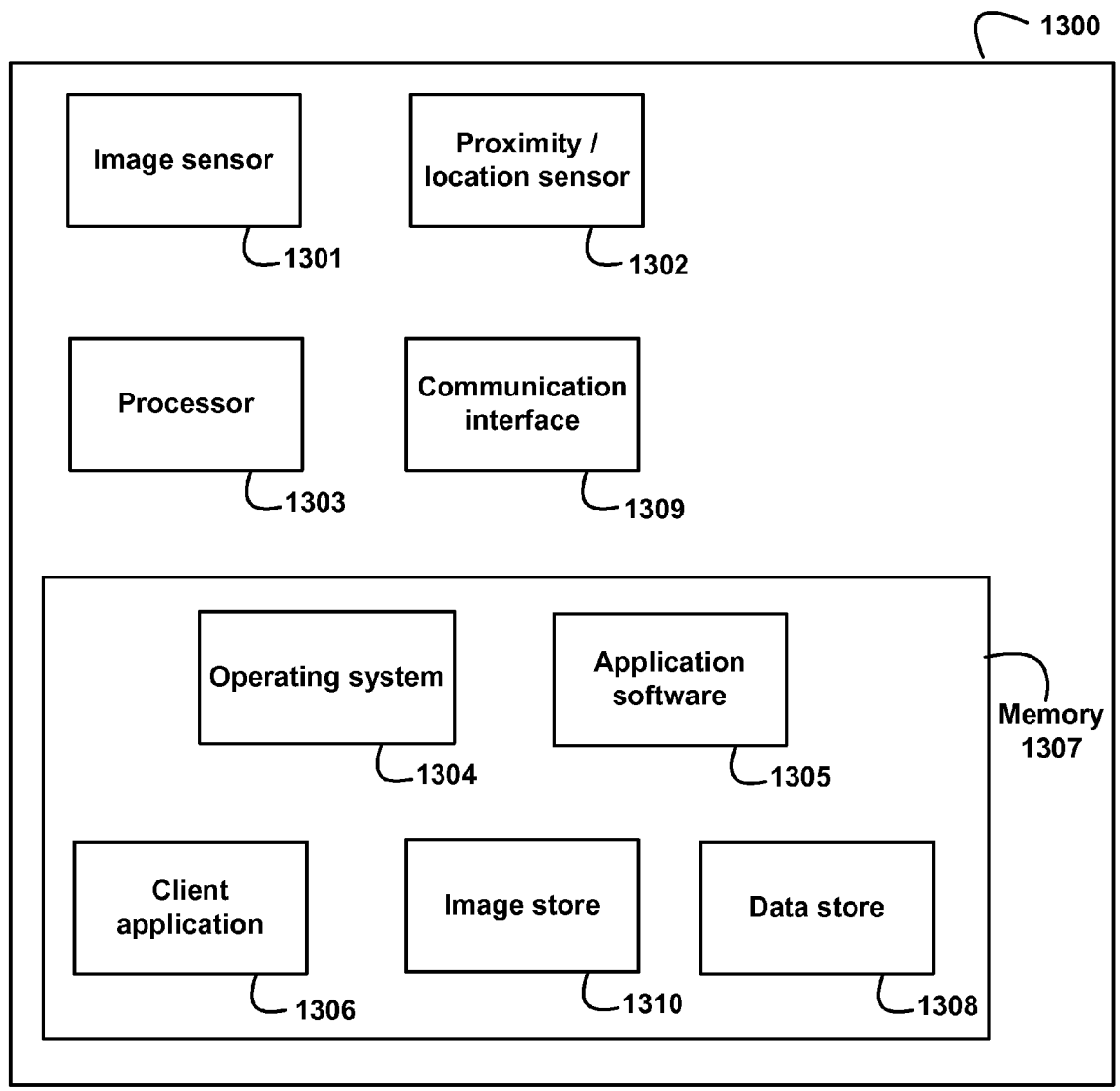
FIGS. 13 and 14 illustrate exemplary computing-based devices in which embodiments of the methods described herein may be implemented.

FIG. 13 illustrates various components of an exemplary computing-based device 1300 which may be implemented as any form of a computing and/or electronic device, and in which embodiments of the methods described above may be implemented. In particular, the computing-based device 1300 may comprise another example of an image capture device.

Computing-based device 1300 comprises an image sensor 1301 and a proximity/location sensor 1302. The proximity/location sensor 1302 may comprise a GPS receiver or any other sensor capable of detecting the location of the device 1300. Alternatively, the proximity/location sensor 1302 may comprise one or more of a wireless transmitter, receiver or transceiver, which may use a PAN, short range or other wireless technology.

The computing-based device 1300 also comprises one or more processors 1303 which may be microprocessors, controllers or any other suitable type of processors for processing computing executable instructions to control the operation of the device in order to capture images, capture associated data and upload the image data and associated data (as described above). Platform software comprising an operating system 1304 or any other suitable platform software may be provided at the computing-based device to enable application software 1305, 1306 to be executed on the device. The application software may comprise a client application 1306 comprising executable instructions arranged to cause the device to capture images, capture associated data and upload the image and associated data.

The computer executable instructions may be provided using any computer-readable media, such as memory 1307. The memory is of any suitable type such as random access memory (RAM), a disk storage device of any type such as a magnetic or optical storage device, a hard disk drive, or a CD, DVD or other disc drive. Flash memory, EPROM or EEPROM may also be used. The memory 1307 may also be used for an image store 1310 and a data store 1308.

The computing-based device 1300 may further comprise a communication interface 1309 for uploading images and data, or alternatively the proximity/location sensor 1302 may be used (e.g. where it comprises a transmitter and receiver or transceiver).

The computing-based device 1300 may also comprise one or more inputs which are of any suitable type for receiving media content, Internet Protocol (IP) input etc and one or more outputs, e.g. for providing an audio and/or video output to a display system integral with or in communication with the computing-based device. The display system may provide a graphical user interface, or other user interface of any suitable type.

Figure 14:
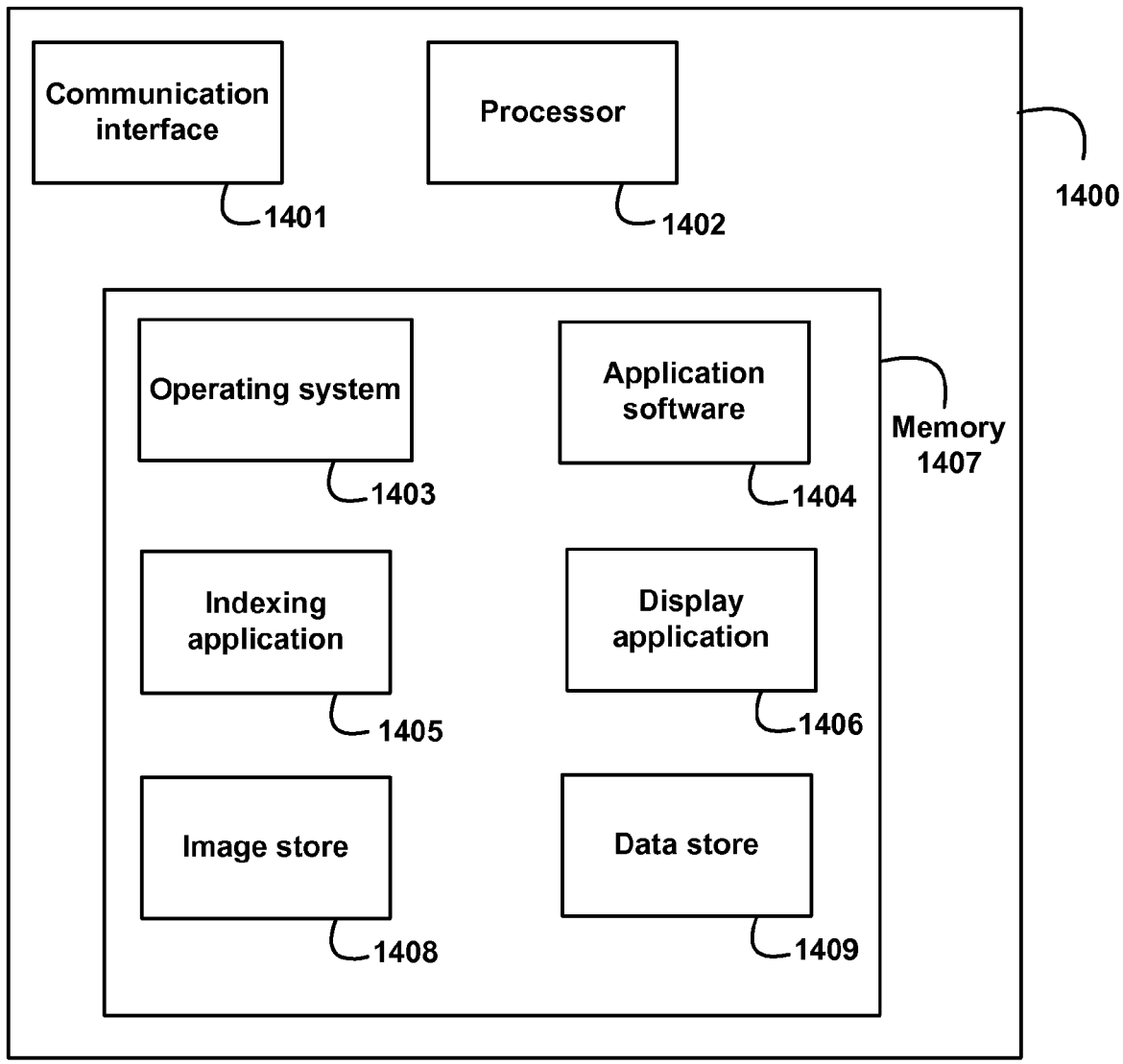

FIG. 14 illustrates various components of an exemplary computing-based device 1400 which may be implemented as any form of a computing and/or electronic device, and in which embodiments of the methods described above may be implemented. In particular the computing-based device 1400 may be arranged to link sequences of images and to present linked sequences concurrently and in temporal alignment.

The computing-based device 1400 comprises a communication interface 1401 for receiving image and associated data. The computing-based device 1400 also comprises one or more processors 1402 which may be microprocessors, controllers or any other suitable type of processors for processing computing executable instructions to control the operation of the device in order to link sequences of images and present linked sequences concurrently and in temporal alignment. Platform software comprising an operating system 1403 or any other suitable platform software may be provided at the computing-based device to enable application software 1404-

1406 to be executed on the device. The application software comprises an indexing application 1405, comprising executable instructions to cause the processor to search stored data to identify proximate devices and to link sequences of images, and a display application 1406, comprising executable instructions to cause the processor to present a plurality of linked sequences to a user using a local or a remote display device.

The computer executable instructions may be provided using any computer-readable media, such as memory 1407. The memory is of any suitable type such as random access memory (RAM), a disk storage device of any type such as a magnetic or optical storage device, a hard disk drive, or a CD, DVD or other disc drive. Flash memory, EPROM or EEPROM may also be used. The memory may further comprise an image store 1408 and a data store 1409.

The computing-based device 1400 may further comprise one or more inputs which are of any suitable type for receiving media content, Internet Protocol (IP) input etc and one or more outputs such as an audio and/or video output to a display system integral with or in communication with the computing-based device. The display system may provide a graphical user interface, or other user interface of any suitable type. The communication interface 1401 may be used to output the data for display to a user or alternatively a separate output may be provided.

Although the present examples are described and illustrated herein as being implemented in a web based system, the system described is provided as an example and not a limitation. As those skilled in the art will appreciate, the present examples are suitable for application in a variety of different types of computing systems.

The FIGS. showing apparatus comprise functional elements which may be combined in any way. Furthermore the devices may comprise additional elements not shown in the FIGS. Whilst FIGS. 2, 4 and 7 show separate image and data stores 102, 103, 704, 705, in some examples, the image and data stores may be combined into a single store (e.g. as shown in FIG. 6). Other elements within the FIGS. may be combined to create further example devices. Furthermore, whilst FIG. 8 shows both identification of sequences and the presentation of those identified sequences, in some examples, different apparatus may perform the identification and presentation method blocks or the method may be performed in a distributed manner across a number of devices.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The term 'window' is used herein to refer to a viewing area on a screen which provides a graphical user interface.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. One or more computer-readable storage devices, with device-executable instructions for performing acts comprising:
   receiving a plurality of images and associated data from a plurality of image capture devices, wherein the associated data comprises:
   a capture time for each image;
   an identifier of a first image capture device that captured the image;
   for at least one particular image of the plurality of images, an identifier of a second image capture device that was in proximity to the first image capture device when the particular image was captured; and
   an authentication key associated with the second image capture device, the authentication key being usable to grant access to a second image captured by the second image capture device, the capture time of the image, the identifier of the second image capture device, and the authentication key being received from the first image capture device;

identifying a plurality of sequences of images captured by a set of image capture devices whilst in proximity to each other based on the associated data; and presenting the plurality of sequences of images concurrently and in temporal alignment, wherein each sequence of images is displayed in a distinct region of a display window and each sequence of images is displayed with an identifier associated with a user of the image capture device through which the sequence of images was captured.

2. The one or more computer-readable storage devices according to claim 1, wherein the associated data further comprises location data, the location data comprises a capture location associated with each image.

3. The one or more computer-readable storage devices according to claim 2, wherein the display window comprises a plurality of distinct regions; and relative locations of the distinct regions in the display are indicative of the relative capture locations associated with each sequence of images displayed in the plurality of distinct regions, the relative capture locations including at least two different capture locations.

4. The one or more computer-readable storage devices according to claim 1, wherein identifying a plurality of sequences of images captured by a set of image capture devices whilst in proximity to each other based on the associated data comprises:

searching stored data to identify a set of image capture devices n proximity to each other for a period of time;

identifying sequences of images captured by each identified device in the set during said period of time; and linking the identified sequences of images.

5. The one or more computer-readable storage devices according to claim 4, wherein searching stored data to identify a set of image capture devices in proximity to each other for a period of time comprises:

searching stored data to identify a set of image capture devices in proximity to each other for a period of time; and filtering the set of image capture devices based on defined criteria to generate a filtered set of image capture devices.

6. The one or more computer-readable storage devices according to claim 5, wherein the defined criteria comprises a device group to which one or more of the plurality of image capture devices may belong.

7. The one or more computer-readable storage devices according to claim 6, wherein a particular image capture device is associated with a plurality of device groups.

8. The one or more computer-readable storage devices according to claim 1, wherein presenting the plurality of sequences of images concurrently and in temporal alignment comprises:

identifying a plurality of sequences for display; and generating a display comprising the plurality of sequences in temporal alignment.

9. The one or more computer-readable storage devices according to claim 8, wherein generating a display comprising the plurality of sequences in temporal alignment comprises:

outputting each of the plurality of sequences to a different address, wherein each said address is associated with a region on a display, each address being either an e-mail address, an IP address or a telephone number.

10. The one or more computer-readable storage devices according to claim 8, wherein generating a display comprising the plurality of sequences in temporal alignment comprises:

displaying each of a plurality of sequences in temporal alignment in a different region of a display window.

11. The one or more computer-readable storage devices according to claim 8, wherein the display comprising the plurality of sequences in temporal alignment is generated in response to receiving a request.

12. The one or more computer-readable storage devices according to claim 1, wherein the identifier associated with the user of the image capture device through which the sequence of images was captured is an image of the user.

13. The one or more computer-readable storage devices according to claim 1, wherein the plurality of sequences of images are presented on a situated display.

14. The one or more computer-readable storage devices according to claim 13, wherein the situated display is located at an event at which the plurality of sequences of images were captured.

15. A method comprising:

receiving a plurality of images and associated data from a plurality of image capture devices, wherein the associated data comprises:

a capture time for each image;

an identifier of a first image capture device that captured the image;

for at least one particular image of the plurality of images, an identifier of a second image capture device that was in proximity to the first image capture device when the particular image was captured; and a second image capture device time, the second image capture device time indicating a time according to the second image capture device, the capture time of the image, the identifier of the second image capture device, and the second image capture device time being received from the first image capture device;

identifying a plurality of sequences of images captured by a set of image capture devices whilst in proximity to each other based on the associated data;

determining, for each of the plurality of image capture devices, one or more groups to which a user of the image capture device belongs;

receiving a user request to view the plurality of images;

determining one or more groups to which the user requesting to view the plurality of images belongs;

selecting for display, one or more sequences of images from the plurality of sequences of images, wherein the one or more sequences of images that are selected were captured by a user belonging to a group to which the user requesting to view the plurality of images also belongs; and displaying the selected one or more sequences of images concurrently and in temporal alignment.

16. A method as recited in claim 15, wherein displaying the selected one or more sequences of images comprises:

generating display having a plurality of distinct regions; and displaying each sequences of images of the one or more sequences of images in different region of the plurality of distinct regions.

17. A method as recited in claim 16, wherein relative positions of the distinct regions within the display correspond to relative geographic locations at which the sequences of images displayed in the distinct regions were captured.

* * * * *